P. H. SCHLUETER.
MANUFACTURE OF FONDANT.
APPLICATION FILED MAR. 8, 1916.
1,201,357.
Patented Oct. 17, 1916.
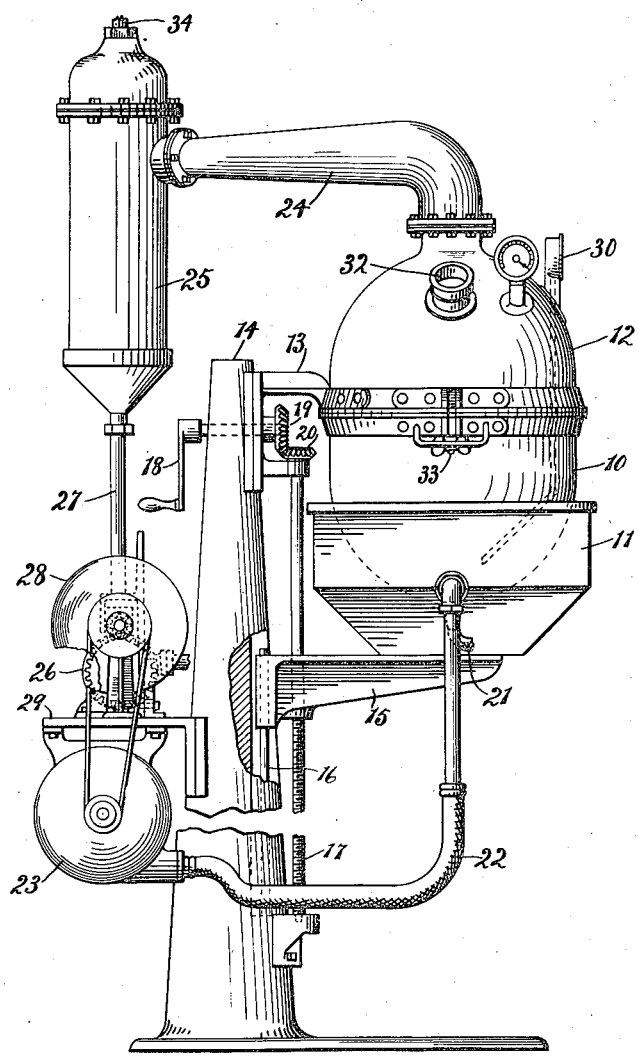
Inventor:
Peter H Schlueter.
By Gillson & Gillson Atty's

UNITED STATES PATENT OFFICE.

PETER H. SCHLUETER, OF CHICAGO, ILLINOIS.

MANUFACTURE OF FONDANT.

1,201,357.  Specification of Letters Patent. Patented Oct. 17, 1916.

Application filed March 8, 1916. Serial No. 82,816.

*To all whom it may concern:*

Be it known that I, PETER H. SCHLUETER, a citizen of the United States, and resident of Chicago, county of Cook, and State of Illinois, have invented certain new and useful Improvements in the Manufacture of Fondant, of which the following is a specification, and which are illustrated in the accompanying drawings, forming a part thereof.

The invention relates to the manufacture of candy and more particularly to an improved method of preparing the syrup, which, by subsequent treatment in a well-known manner is formed into the cream or so-called fondant employed as the filling for chocolate drops and other bonbons.

The object of the invention is to simplify the process of manufacturing the said cream, to reduce the time required therefor and to produce a cream of improved quality and flavor.

An apparatus which may be employed in practising the invention is illustrated in the accompanying drawing, the same being a side elevation of the apparatus with some of the parts broken away.

The said cream is preferably prepared principally from pure cane sugar, although a small proportion of an agent, as glucose, to prevent the reversion or graining of the sugar after cooking is usually required.

The invention may be practised by using cane sugar and glucose in the proportion of twenty-five pounds of sugar and five pounds of glucose. These materials are mixed with only enough water to effect a complete solution of the materials when boiled and the boiling is continued in the open air until the batch attains a temperature corresponding to 228 degrees Fahr. at sea level. A vacuum which is as nearly complete as possible is then applied and the application of heat is discontinued as soon as a vigorous ebullition indicates that the pressure has been reduced. If a vacuum corresponding to 28 or 28½ inches of mercury at sea level is attained, the application of the vacuum will be continued for only about four or five minutes. The syrup will then have the same density as if cooked in the open air to a temperature corresponding to 238 degrees at sea level and it will cool during the said application of the vacuum to such a temperature that the beating or other treatment by which the syrup is to be formed into the cream or fondant may proceed immediately.

In the accompanying drawing a kettle within which the batch may be cooked, as above described, is indicated at 10. This kettle is desirably removably supported upon a gas furnace 11. For permitting the cooking to be practised both in the open air and under vacuum, the kettle 10 is shown as being vertically alined with a hood 12 and the two are supported for relative vertical movement. Preferably the hood 12 is fixedly supported, as through a bracket arm 13. This projects laterally from the top of a standard 14. In this instance the kettle 10 is moved to and from the hood 12 by raising and lowering the kettle. To this end the furnace 11 is mounted upon a bracket arm 15 and this bracket arm is slidingly connected to the standard 14, as by having its inner end mounted in a vertical slideway 16 of the standard. An upright shaft 17 having threaded engagement with the bracket 15 and operated through a crank 18 and beveled gears 19, 20, provide a convenient means for raising and lowering the bracket 15 to correspondingly raise and lower the kettle 10. The furnace 11 is supplied with gas through a pipe 21 and with air blast through a pipe 22, the latter leading from a blower 23.

An elbow 24 permanently connects the hood 12 with a condenser 25 and the foot of the condenser is connected with a vacuum pump 26, as through a pipe 27. An electric motor 28 serves both for operating the blower 23 and vacuum pump 26. For this purpose the blower 23, vacuum pump 26 and motor 28 are desirably supported upon a shelf 29 secured to the back of the standard 14, and are operatively connected by mechanism including clutches, all as more fully appears in my patent on cooking vessel, No. 1,135,210, dated April 13, 1915. The hood 12, preferably supporting a thermometer 30 in position to enter the kettle 10 when the latter is raised in contact with the hood. Also a vacuum gage 31 and sight glass 32.

For cooking the batch in the open air, as described, the kettle 10 is conveniently supported below the hood 12 but separated therefrom. When the said temperature of 228 degrees Fahr. has been attained, the kettle 10 is raised to a position in which its rim contacts with the rim of the hood 12 and the two are united, as by clamps, one of which is shown at 33. It will be understood that this raising of the kettle is conveniently accomplished by turning the crank 18. The pump 23 is operated in connection with the introduction of water into the condenser 25, as through a pipe 34, to produce the desired vacuum over the batch in the kettle 10, and the fire in the furnace 11 is extinguished as soon as the pressure has been reduced. When the operation is completed, the clamps, as 33, are loosened and the kettle 10 again lowered.

As a temperature corresponding to only 228 degrees F. is required to be attained the cooking operation itself requires much less time than when the syrup is to be completely cooked in the open air. Furthermore, as it is well known that the beating of the syrup cannot be commenced until the syrup has cooled, practically all of the time heretofore required for allowing the syrup to cool is saved by the fact that the batch cools during the application of the vacuum. The syrup is also white and sweeter than when completely cooked and can be formed into a cream of improved appearance and flavor.

I claim as my invention,—

1. The process of preparing a syrup of suitable density for the formation of cream which consists in cooking a solution of sugar at atmospheric pressure to a density less than that required for the finished syrup and in then subjecting the batch to a vacuum without further application of heat.

2. The process of preparing a syrup of the same density as if cooked at atmospheric pressure to a temperature corresponding to 238 degrees F. at sea level, which consists in cooking a solution of cane sugar and a reversion preventing agent at atmospheric pressure to a temperature corresponding to 228 degrees F. at sea level and in then subjecting the batch to a vacuum of an intensity corresponding to a minus pressure of at least twenty-eight inches of mercury at sea level without further application of heat.

PETER H. SCHLUETER.